United States Patent [19]

Curry

[11] Patent Number: 5,233,367
[45] Date of Patent: Aug. 3, 1993

[54] MULTIPLE BEAM INTERLACED SCANNING SYSTEM

[75] Inventor: Douglas N. Curry, Menlo Park, Calif.
[73] Assignee: Xerox Corporation, Stamford, Conn.
[21] Appl. No.: 946,717
[22] Filed: Sep. 18, 1992
[51] Int. Cl.⁵ .............................................. H04N 1/21
[52] U.S. Cl. .................................... 346/108; 358/296
[58] Field of Search ................... 346/108, 107 R, 160; 358/296, 298, 300, 302

[56] References Cited

U.S. PATENT DOCUMENTS

| | | | |
|---|---|---|---|
| 3,781,464 | 12/1973 | Bousky | 358/206 |
| 4,445,126 | 4/1984 | Tsukada | 346/108 |
| 5,119,113 | 6/1982 | Brakash et al. | 346/108 |

FOREIGN PATENT DOCUMENTS 2069176A  8/1981  United Kingdom.

Primary Examiner—Mark J. Reinhart
Attorney, Agent, or Firm—Oliff & Berridge

[57] ABSTRACT

An image forming apparatus and method for interlace scanning plural light beams by deflecting the plural beams with a rotating polygon onto a recording medium wherein the spacing between adjacent beams hold the relation $$\frac{I}{Q} = \frac{Bwf}{V_o}$$

wherein I is an interlace factor equal to the number of reference scans between adjacent beams from a single facet of the polygon on the photoreceptor. The photoreceptor velocity is $V_o$, w is the polygon angular velocity, f is a number of facets per revolution of the polygon, Q is the number of beams and B is the beam spacing.

27 Claims, 8 Drawing Sheets

MULTIPLE BEAM INTERLACED SCANNING SYSTEM

BACKGROUND OF THE INVENTION

1. Field of the Invention

The present invention relates generally to an image forming apparatus and method, and in particular to an apparatus and method for image formation by scanning a photoreceptor with a plurality of interlaced scan lines.

2. Description of Related Art

As disclosed in UK Patent Application GB 2,069,176A, an image forming apparatus for scanning with a plurality of interlaced scanning lines has been previously proposed. This system interlaces the scan lines between previously scanned lines so that the scanning lines never overlap each other but are equally spaced from one another. This equally spaced scanning is achieved by solving Eq. (1):

$$p = \frac{P}{(mM - 1)}$$

where p is the distance between adjacent scan lines, P is the distance between adjacent beams on the photoreceptor, m is an integer greater than 0 and M is the number of light sources. Such an apparatus has the disadvantage of requiring a certain number of light sources dependent on the scan spacing. For example, if it was desired to have $$\frac{P}{p} = 4$$

it would be required to have a system having 3 light sources. Such a system could not have $$\frac{P}{p} = 4$$

with 4 sources or with 2 sources. Also, this system does not allow multiple scanning, where subsequently laid down scans are scanned on top of scans previously laid down, or fractional scanning where the interlaced scan lines are unequally spaced from one another.

U.S. Pat. No. 4,445,126 discloses an image forming apparatus in which a recording medium is scanned with plural light beams. It does not disclose interlacing light beams.

SUMMARY OF THE INVENTION

It is therefore an object of the present invention to provide a multibeam image forming apparatus and method for interlacing additional scan lines between scan lines already laid down so that the scan lines are equally spaced.

It is a further object of the present invention to provide a multibeam image forming apparatus and method for multiple scanning, where additional scan lines are laid down on top of previously laid down scan lines.

It is a further object of the present invention to provide a multibeam image forming apparatus and method for fractional scanning where additional scan lines are interlaced between those previously laid down so that the resulting scan lines are unequally spaced.

In order to realize this and other objects of the present invention, an apparatus and method are provided, the apparatus comprising a scanning optical system for scanning a photoreceptor with a plurality of light beams, an optical system for focusing said beams on the photoreceptor and a rotating polygon placed between the light source and the photoreceptor for deflecting the plurality of light beams onto the photoreceptor. As the photoreceptor moves and the polygon rotates through a single facet, the plurality of beams will lay down another set of scan lines on top of or between the previously laid down scan lines. Successive facets will position additional scan lines between or on top of these scans until the beam set has passed through the motion of the photoreceptor.

BRIEF DESCRIPTION OF THE DRAWINGS

Further advantages and features of the invention will become apparent when the following detailed description is read in conjunction with the attached drawings in which.

DETAILED DESCRIPTION OF THE PREFERRED EMBODIMENT

Figure 1:
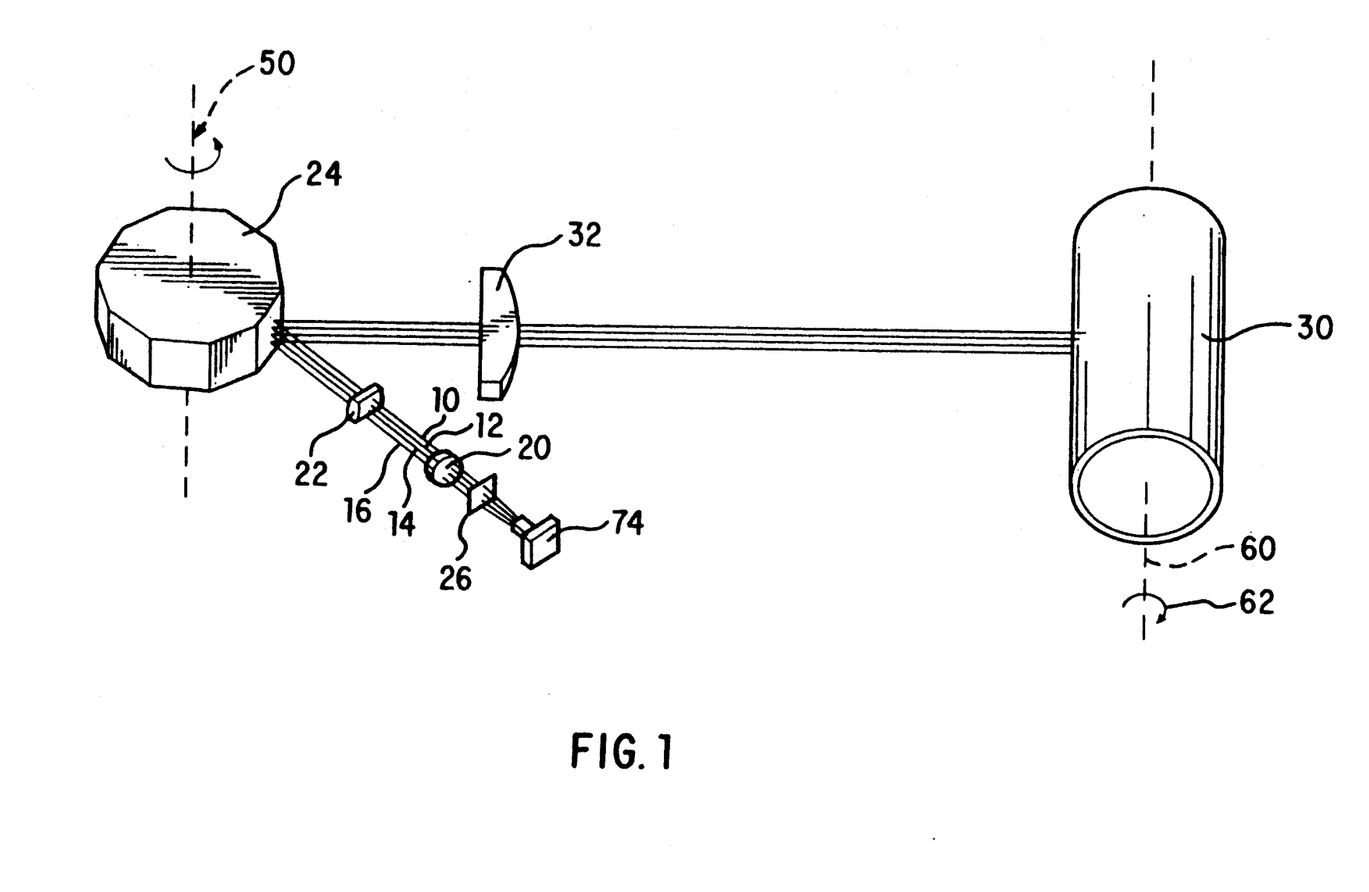
FIG. 1 is a block diagram of a printer having a multiple beam scanner in which the present invention may be employed.

In FIG. 1 there is shown a conventional multibeam printer having a reflective, multifaceted polygon 24 which is rotated about its central axis 50, to repeatedly scan multiple light beams 10, 12, 14 and 16 in a line scanning direction across a photosensitive recording medium 30. While being scanned by the light beams, the recording medium 30 is advanced (by means not shown) in an orthogonal direction denoted by the arrow 62 so that the light beams 10, 12, 14 and 16 expose it in accordance with a raster scanning pattern representing the image to be printed.

As a general rule, the light beams 10, 12, 14 and 16 are supplied by laser diodes housed in a beam generating diode array 74 and are intensity modulated in accordance with data samples representing the image to be printed. The beams 10, 12, 14 and 16 generated by the laser diode array 74 pass through an aperture 26 that truncates the beams to their mutually overlapping widths. The beams 10, 12, 14 and 16 then pass through a collimator 20 and a cylinder lens 22 that focuses the beams 10, 12, 14, and 16 on the polygon 24. The beams 10, 12, 14 and 16 are then deflected onto an optical path toward the photosensitive recording medium 30 by the rotating polygon 24. The beams 10, 12, 14 and 16 then pass through a corrective optical system 32 which compensates for various beam errors. A controller (not shown) can alter the number of beams generated, the spacing between the beams, the angular velocity of the polygon 24 or the velocity of the photoreceptive recording medium 30.

As the photoreceptor moves and the polygon rotates through a single facet, the beam set will lay down multiple scans. Successive facets will position scans between or on top of those already laid down until the beam set has passed due to the motion of the photoreceptor.

Scans produced on the recording medium by adjacent light beam sources are separated vertically by beam spacing B, and the beam spacing for a multibeam system must be uniform. The distance between adjacent scans laid down by a single facet of the polygon, measured in scans, is the interlace factor I and must be a number greater than 0. Eq. (2) defines the relationship among these variables:

$$\frac{I}{Q} = \frac{Bwf}{V_o}$$

where $V_o$ is the exposure medium velocity, w is the polygon angular velocity, f is the number of facets per revolution of the polygon, Q is the number of equally spaced beams, B is the beam spacing, and I is the interlace factor.

Generally, for interlace scanning, any positive value for the interlace factor I may be selected. By selecting various values for the interlace factor I and the number of beams Q, it is possible to obtain equally spaced, fractional or multiple interlace scanning.

For equally spaced, non-overlapped interlace scanning any positive integer for I may be selected so long as I and Q do not have any common integer divisors greater than 1. For equally spaced, non-overlapped, interlace scanning, the interlace factor I is the distance between adjacent scans laid down by a single facet of the polygon divided by the distance between adjacent, interlaced scans. An example of this can be seen in FIG. 2, which is a diagram showing the scans laid down by a four beam system where the interlace factor I is 3. The circles A, B, C and D represent scans laid down by adjacent sources by a single facet of the polygon. Between any two adjacent scans laid down by a single facet of the polygon are interlaced additional scans laid down by prior or subsequent facets of the polygon. In this way, uniform, non-overlapped scanning will occur.

Figure 7:
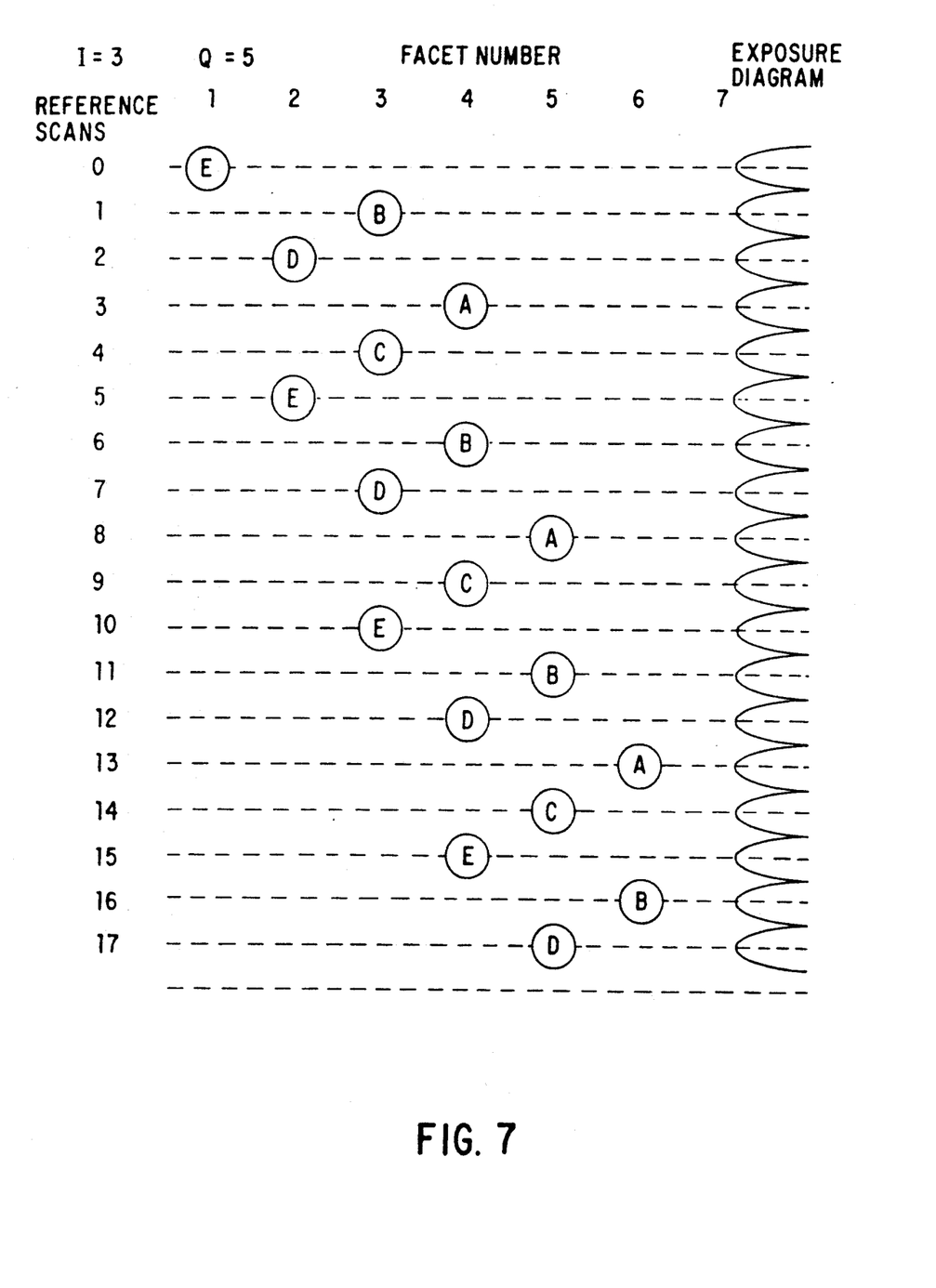
FIG. 7 is a diagram showing scan spacing where $I=3$ and $Q=5$.
Figure 8:
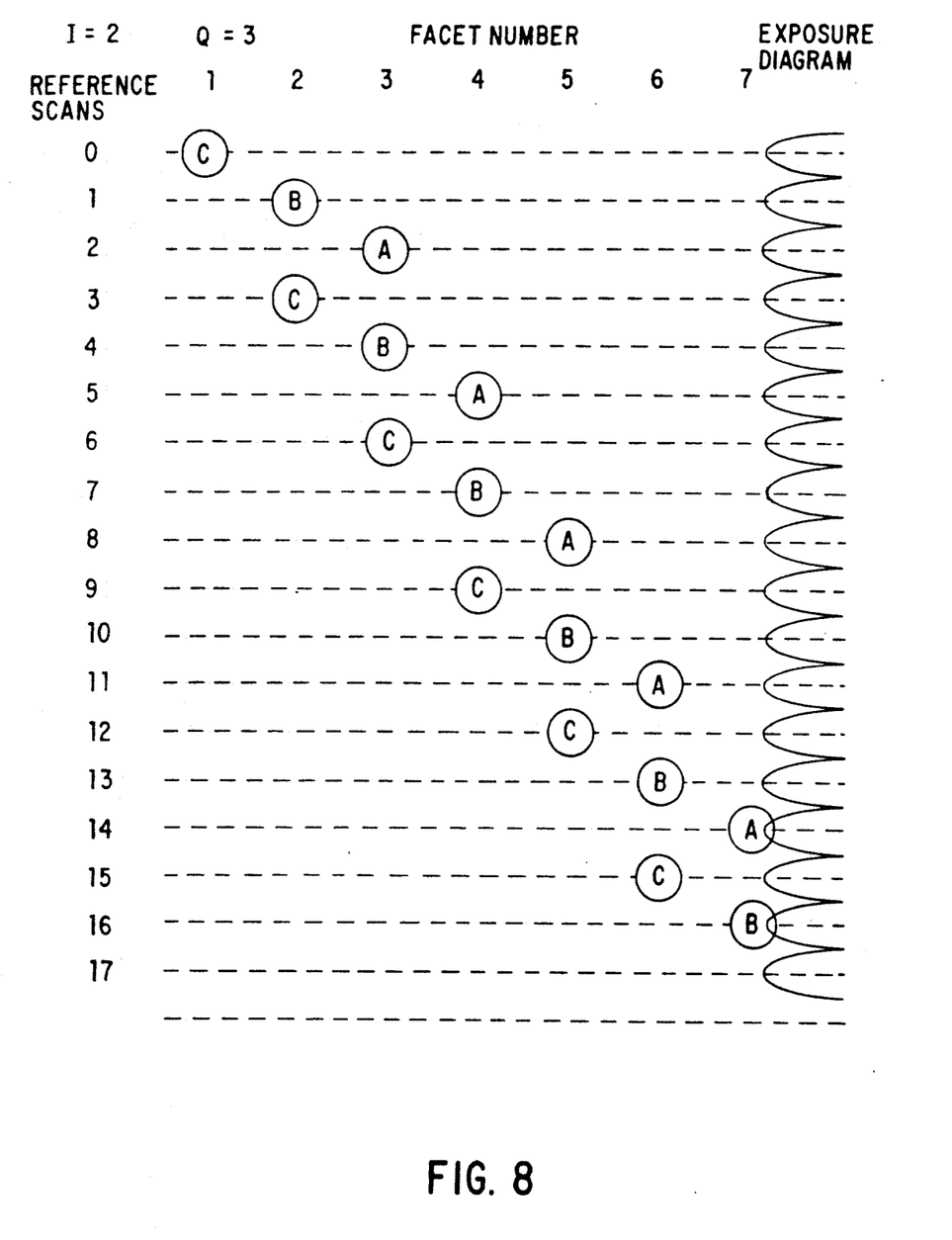
FIG. 8 is a diagram showing scan spacing where $I=2$ and $Q=3$.

A reference scan is the number of scans the media moves during a single facet of the polygon, and it is equal to the number of beams being used. For example, when there are four sources, Q=4, the media moves four reference scans during a facet time regardless of the velocity of the media or the polygon. This can also be thought of as the average scan rate since, if four beams per facet are laid down, then, at any stationary point, the laser scanner will traverse four scans per facet in the process direction on average, regardless of the speed at which scanning is occurring or how fast the media is moving. FIGS. 2 through 6 illustrate this concept showing that any laser diode spot represented by A, B, C or D moves four reference scans per facet since, in these examples, Q=4. In FIG. 7, the number of sources, Q, is five, and the number of reference scans moved per facet is shown as five. In FIG. 8, the number of sources, Q, is three, and the number of reference scan move per facet is shown as three.

Figure 2:
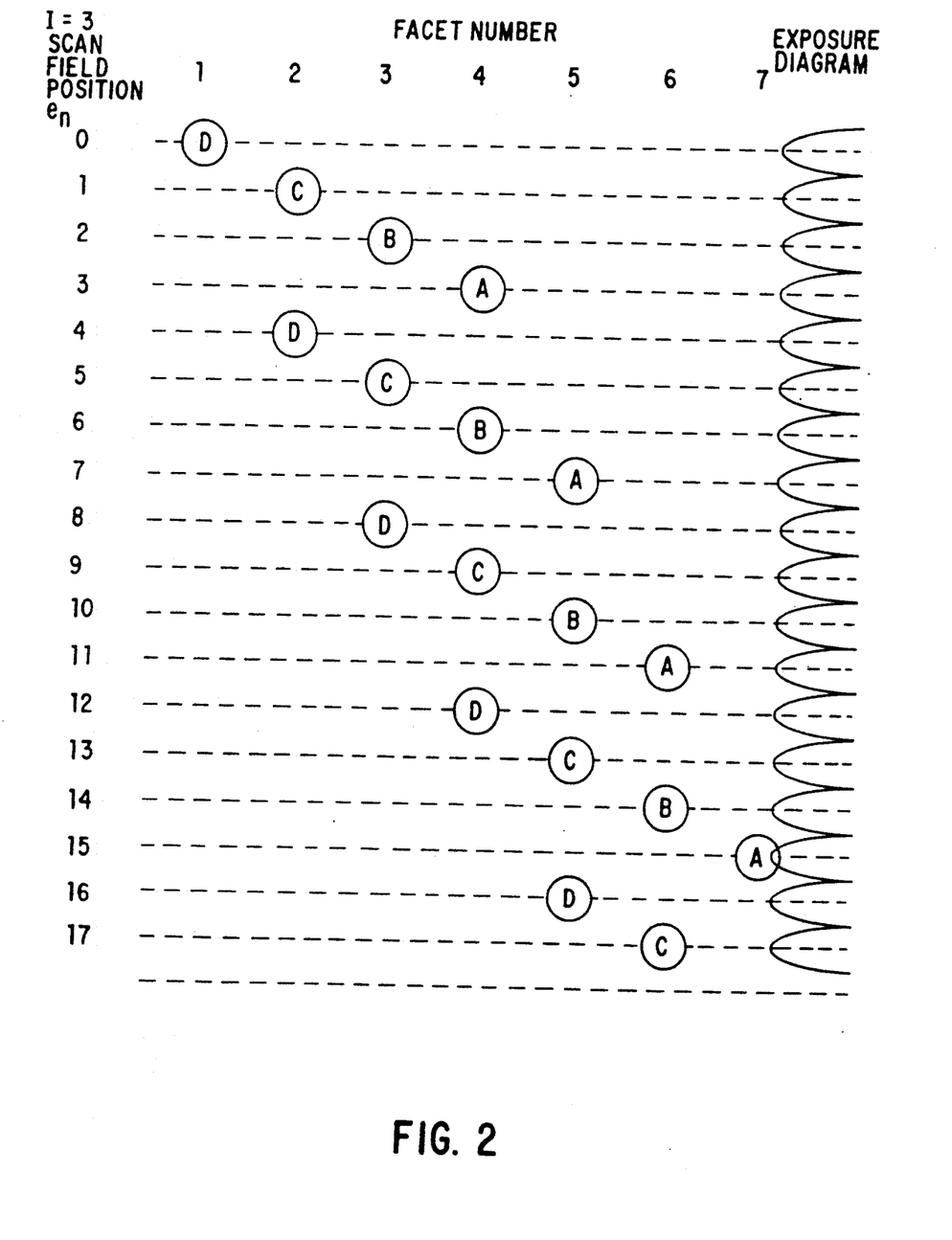
FIG. 2 is a diagram showing scan spacing where $I=3$ and $Q=4$.

In FIG. 2, the interlace factor is the number of reference scans separating two adjacent beams on a single facet at the photoreceptor, in this example, the interlace factor is three. This number is affected by media velocity or polygon rotational rate, as shown in equation 2.

Figure 3:
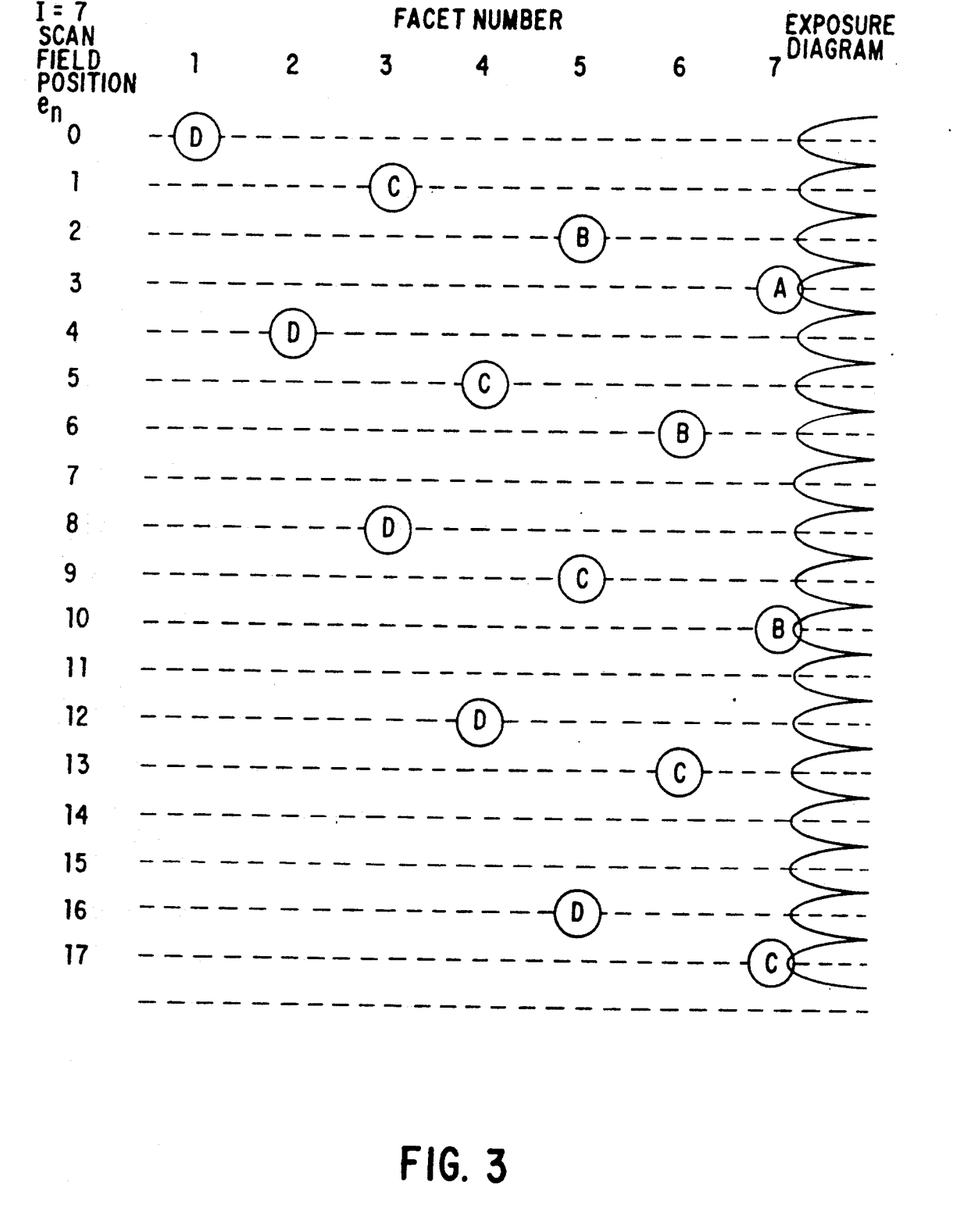
FIG. 3 is a diagram showing scan spacing where $I=7$ and $Q=4$.

FIG. 3 illustrates the situation where the interlace factor I is 7 and the number of sources Q is 4. Because I and Q have no common divisors greater than 1 and I is a positive integer, non-overlapped, interlaced scanning will occur. Adjacent scans laid down during a single facet of the polygon are separated by a distance of 7 as measured in reference scans. For example, during facet 3 circles C and D are separated by a distance of 7 reference scans. This situation is obtained by adjusting variables B, $V_o$, f and $\omega$ in equation 2.

Figure 4:
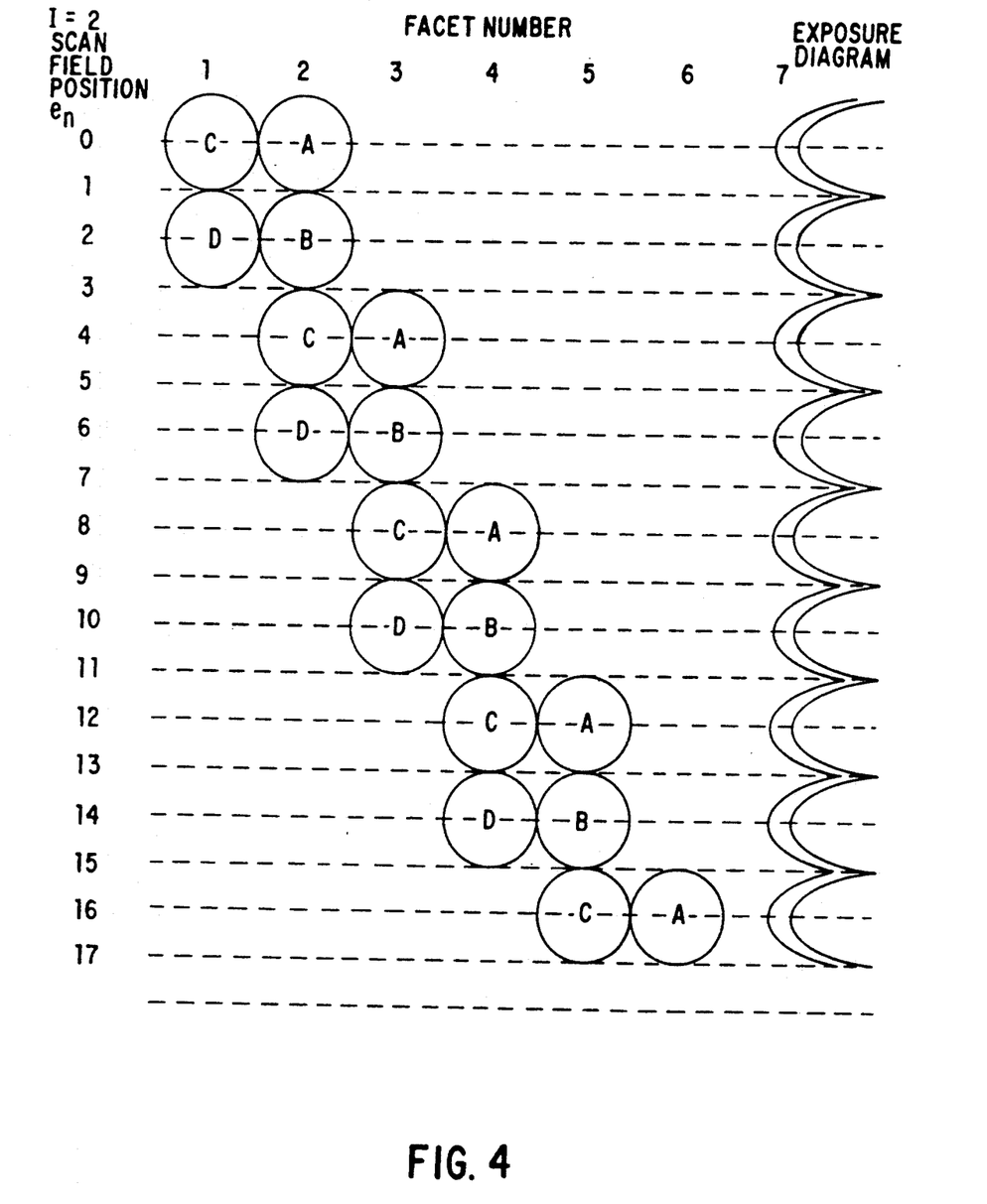
FIG. 4 is a diagram showing scan spacing where $I=2$ and $Q=4$.
Figure 5:
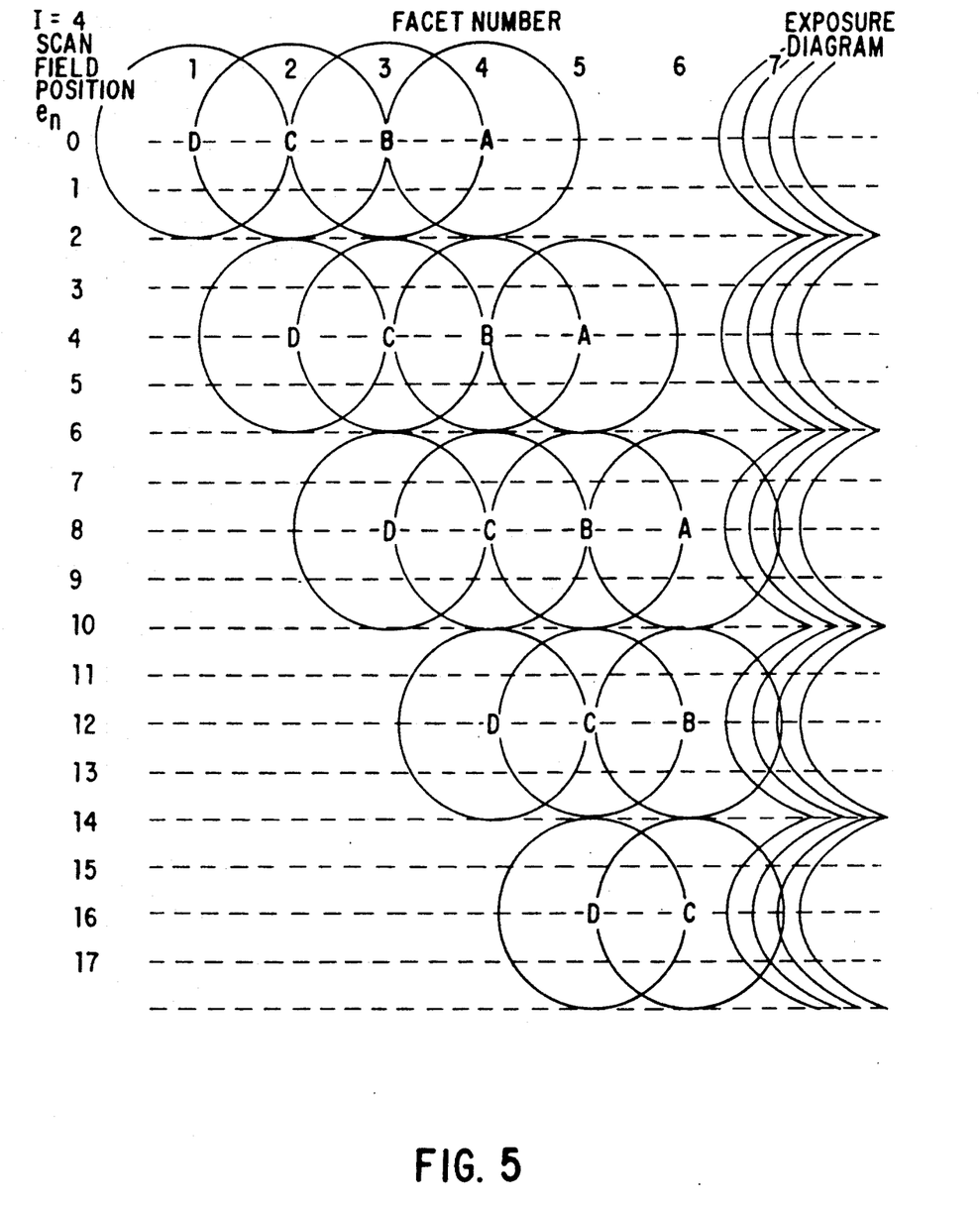
FIG. 5 is a diagram showing scan spacing where $I=4$ and $Q=4$.

FIGS. 4 and 5 illustrate multiple overlapped scanning. In this situation, I is a positive integer and has a common integer divisor greater than 1 with Q, the number of sources. Subsequent beams are laid down on top of those laid down during previous scans. Where I and Q have a common divisor equal to 2, double scanning will occur, as can be seen in FIG. 4. Where I and Q, the number of sources have an integer divisor equal to 4, quadruple scanning will occur, as can be seen in FIG. 5. Thus the common divisor dictates the multiple of scans that will occur. Again, in both these instances, the spot size can be increased to produce a uniform image. This is illustrated in FIGS. 2, 5 and 6 by varied sizes of the circles A, B, C and D.

Figure 6:
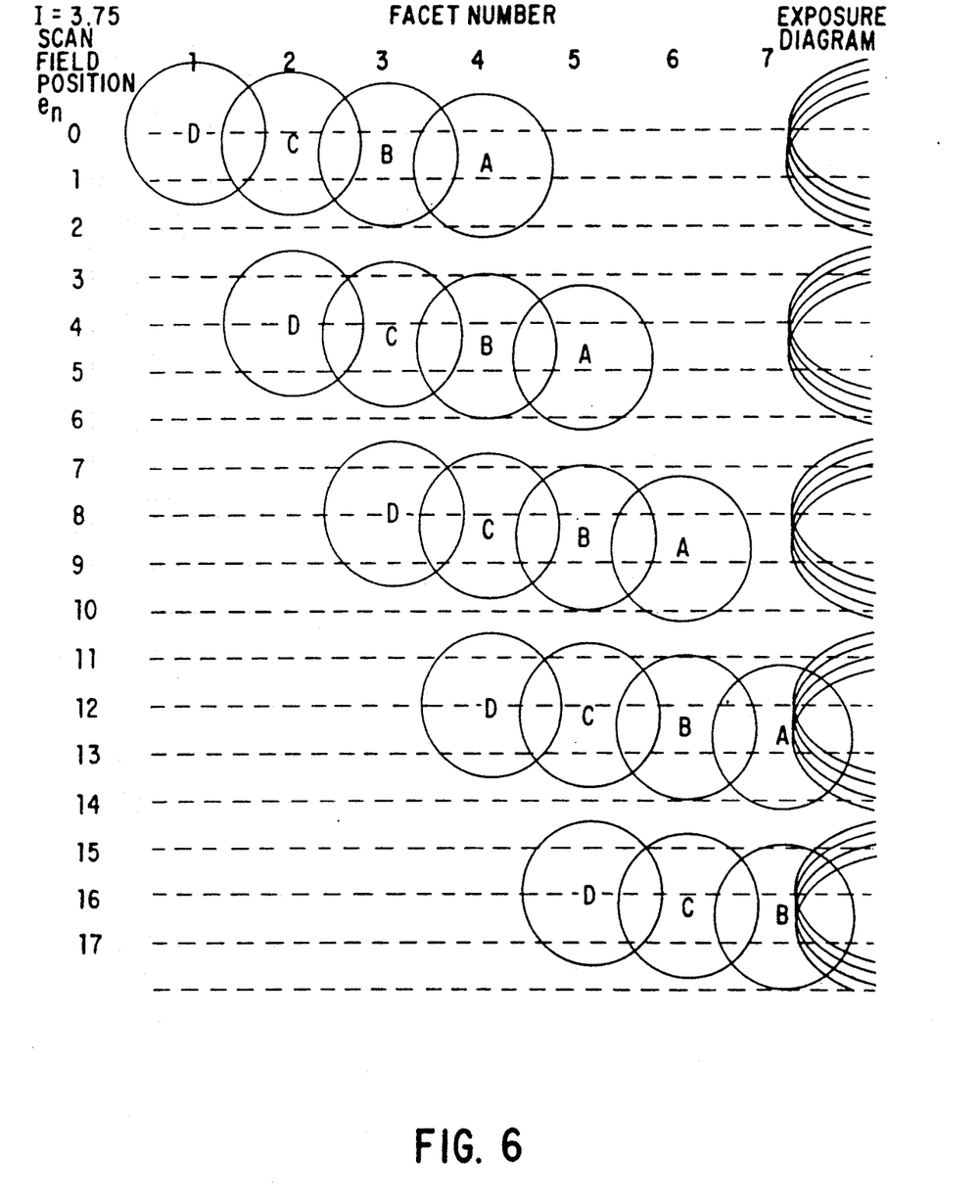
FIG. 6 is a diagram showing scan spacing where $I=3.75$ and $Q=4$.

FIG. 6 illustrates fractional interlace scanning where I=3.75 and the number of sources Q equals 4. This fractional interlace scanning produces overlapped scans. The spot size has been increased as can be seen by the larger circles A, B, C and D. By varying the spot size, a uniform image may be obtained. In the case of fractional scanning, the interlace factor again is equal to the distance between adjacent scans laid down on the photoreceptor during a single facet, measured in reference scans. For example, during facet 4, the interlace factor can be seen as the distance between circles A and B, as measured in reference scans.

FIG. 7 shows an example where five sources (i.e., Q=5) are used, and the process velocity, polygon velocity and beam spacing have been adjusted to obtain an interlace factor of three (i.e., I=3). Note that both I and Q have no common denominators, resulting in equally spaced, non-overlapped, interlaced scanning. For five sources, I=1, 2, 3, 4 or any other non-multiple of five will also provide equally spaced, non-overlapped, interlaced scanning.

If three sources are used, for example, as in FIG. 8, equally spaced, non-overlapped, interlaced scanning would result if I were set to any integer not divisible by three (e.g., I=1, 2, 4 or 5).

The invention has been described with reference to the preferred embodiments thereof which are intended to be illustrative rather than limiting. Various changes and modifications may be made without departing from the spirit and scope of the invention as defined in the following claims.

In the claim:

1. An image forming apparatus for interlace scanning with plural light beams, comprising:
   a photoreceptor movable at a predetermined velocity for receiving said beams;
   at least one light source for generating a plurality of beams; and
   a polygon rotatable at a predetermined angular velocity, located between said light source and said photoreceptor, said polygon having facets for deflecting said beams onto said photoreceptor, according to the relation:

$$\frac{I}{Q} = \frac{Bwf}{V_o}$$

wherein I is an interlace factor, equal to a distance between adjacent beams on said photoreceptor, measured in reference scans, $V_o$ is said photoreceptor velocity, w is said polygon angular velocity, f is a number of facets per revolution of said polygon, B is the beam spacing and Q is the number of said beams.

2. The image forming apparatus of claim 1, wherein said interlace factor and said number of beams have no common integer divisors greater than one and said interlace factor is a positive integer.

3. The image forming apparatus of claim 1, wherein said interlace factor and said number of beams have a common integer divisor greater than 1.

4. The image forming apparatus of claim 1, wherein said interlace factor is a positive, non-integer value.

5. The image forming apparatus of claim 1, wherein said interlace factor is selected from the group consisting of 2 and 5 and said number of beams is 3.

6. The image forming apparatus of claim 1, wherein said interlace factor is 3 and said number of beams is 4.

7. The image forming apparatus of claim 1, wherein said interlace factor is selected from the group consisting of 2, 3 and 4 and said number of beams is 5.

8. The image forming apparatus of claim 1, wherein said interlace factor is 5 and said number of beams is 6.

9. The image forming apparatus of claim 1, wherein said light source is a laser diode.

10. The image forming apparatus of claim 1, wherein said light source is a gas laser.

11. A method of interlace scanning using a scanning system having at least one light source, a movable photoreceptor, and a rotatable, mirrored polygon having facets located between said light source and said photoreceptor, comprising the steps of:
generating a plurality of beams with said light source;
deflecting said beams with said polygon onto said photoreceptor according to the relation:

$$\frac{I}{Q} = \frac{Bwf}{V_o}$$

wherein I is an interlace factor, equal to a distance between adjacent beams on said photoreceptor, measured in reference scans, n is equal to any positive integer, $V_o$ is said photoreceptor velocity, w is said polygon angular velocity, f is a number of facets per revolution of said polygon, B is the beam spacing and Q is the number of beams; and
repeating the generating and deflecting steps at least once, wherein said beams are interlaced between or on top of previously or subsequently scanned beams.

12. The method of claim 11, comprising the additional step of focusing said beams with an optical system onto said polygon.

13. The method of claim 11, wherein said interlace factor and said number of beams have no common integer divisors greater than one.

14. The method of claim 11, wherein said interlace factor and said number of beams have a common integer divisor greater than one.

15. The method of claim 11, wherein said interlace factor is a non-integer value.

16. The method of claim 11, wherein said interlace factor is 3 and said number of beams is 4.

17. The method of claim 11, wherein said interlace factor is selected from the group consisting of 2 and 5 and said number of beams is 3.

18. The method of claim 11, wherein said interlace factor is 5 and said number of beams is 6.

19. The method of claim 11, wherein said interlace factor is selected from the group consisting of 2, 3 and 4 and said number of beams is 5.

20. An image forming apparatus for scanning a recording medium by plural light beams, comprising:
a light source generating a plurality of light beams;
a mirrored polygon having facets and being rotatable at an angular velocity for deflecting scanning spots from the plurality of light beams of the light source, the scanning spots being deflected from a first direction by the polygon;
a recording medium for receiving the deflected scanning spots and being movable in a second direction substantially perpendicular to the first direction; and
a controller for controlling the light source, the polygon and recording medium so that image forming can be performed according to an interlace factor according to the equation:

$$\frac{I}{Q} = \frac{Bwf}{V_o}$$

wherein:
I is the interlace factor in scans per beam,
$V_o$ is a recording medium velocity,
w is a polygon angular velocity,
f is a number of facets per revolution of the polygon,
Q is a number of equally spaced beams, and
B is the beam spacing
wherein I and Q are any positive integer values.

21. The image forming apparatus of claim 20, wherein said interlace factor and said number of beams have no common integer divisors greater than 1, and said interlace factor is a positive integer.

22. The image forming apparatus of claim 20, wherein said interlace factor and said number of beams have a common integer divisor greater than one.

23. The image forming apparatus of claim 20, wherein said interlace factor is a positive, non-integer value.

24. The image forming apparatus of claim 20, wherein said interlace factor is selected from the group consisting of 2 and 5 and said number of beams is 3.

25. The image forming apparatus of claim 20, wherein said interlace factor is 3 and said number of beams is 4.

26. The image forming apparatus of claim 20, wherein said interlace factor is 5 and said number of beams is 6.

27. The image forming apparatus of claim 20, wherein said interlace factor is selected from the group consisting of 2, 3 and 4 and said number of beams is 5.

* * * * *